US009014063B2

(12) United States Patent
Lee

(10) Patent No.: US 9,014,063 B2
(45) Date of Patent: Apr. 21, 2015

(54) TDD WIRELESS COMMUNICATION SYSTEM AND METHOD FOR REPORTING HARQ-ACK

(75) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 129 days.

(21) Appl. No.: 13/565,766

(22) Filed: Aug. 2, 2012

(65) Prior Publication Data

US 2013/0034029 A1 Feb. 7, 2013

Related U.S. Application Data

(60) Provisional application No. 61/515,336, filed on Aug. 5, 2011.

(30) Foreign Application Priority Data

Jul. 3, 2012 (TW) .............................. 101123902 A

(51) Int. Cl.
H04W 72/04 (2009.01)
H04L 1/18 (2006.01)
H04L 1/00 (2006.01)

(52) U.S. Cl.
CPC ....... H04L 1/1861 (2013.01); H04L 2001/0096 (2013.01)

(58) Field of Classification Search
CPC ..... H04L 5/0053; H04L 5/001; H04L 1/1861; H04L 5/0055; H04W 72/0406
See application file for complete search history.

(56) References Cited

U.S. PATENT DOCUMENTS

| 2009/0213769 | A1 | 8/2009 | Shen et al. |
| 2010/0067496 | A1 | 3/2010 | Choi |
| 2010/0165931 | A1 | 7/2010 | Nimbalker et al. |
| 2011/0090825 | A1 | 4/2011 | Papasakellariou et al. |
| 2011/0243039 | A1 | 10/2011 | Papasakellariou et al. |

(Continued)

FOREIGN PATENT DOCUMENTS

| CN | 1933366 | 3/2007 |
| EP | 2222011 | 8/2010 |

OTHER PUBLICATIONS

"Office Action of Taiwan Counterpart Application", issued on Jan. 16, 2014, p. 1-p. 4.

(Continued)

Primary Examiner — Jung Park
(74) Attorney, Agent, or Firm — Jianq Chyun IP Office

(57) ABSTRACT

A method for reporting Hybrid Automatic Repeat Request Acknowledgement (HARQ-ACK) is provided. The method is applicable to a time-division duplex (TDD) wireless communication system and includes the following steps: receiving downlink information from a base station with multiple serving cells, calculating a report number of each serving cell, which is a number of subframes of the corresponding serving cell whose acknowledgements have to be reported, and providing report information to the base station in an uplink subframe of a serving cell specified by the base station. The multiple serving cells use multiple uplink-downlink configurations. The report number of at least one of the serving cells is determined according to a downlink association set of the uplink subframe of the serving cell specified by the base station. The report information includes the acknowledgements that have to be reported by each of the serving cells.

28 Claims, 12 Drawing Sheets

(56) References Cited

U.S. PATENT DOCUMENTS

| | | | |
|---|---|---|---|
| 2011/0243066 A1 | 10/2011 | Nayeb Nazar et al. | |
| 2011/0268059 A1 | 11/2011 | Li et al. | |
| 2013/0223299 A1* | 8/2013 | Yang et al. | 370/280 |
| 2013/0250822 A1* | 9/2013 | Yang et al. | 370/280 |
| 2013/0322343 A1* | 12/2013 | Seo et al. | 370/328 |
| 2013/0322397 A1* | 12/2013 | Lee et al. | 370/329 |

OTHER PUBLICATIONS

Samsung, "UL HARQ-ACK timing for TDD CA," 3GPP TSG RAN WG1 68, Feb. 6-10, 2012, pp. 1-4.

Huawei Hisilicon, "HARQ timing design for TDD inter-band CA with different UL-DL configurations," 3GPP TSG RAN WG1 68, Feb. 6-10, 2012, pp. 1-5.

Catt, "TDD inter-band carrier aggregation," 3GPP TSG RAN WG1 68, Feb. 6-10, 2012, pp. 1-4.

Intel Corporation, "Discussion on HARQ feedback of TDD Inter-band Carrier Aggregation," 3GPP TSG RAN WG1 68, Feb. 6-10, 2012, pp. 1-4.

LG Electronics, "Overall structure for full-duplex operation based TDD CA with different UL-DL configurations," 3GPP TSG RAN WG1 68, Feb. 6-10, 2012, pp. 1-8.

3GPP Organizational Partners, "Evolved Universal Terrestrial Radio Access (E-UTRA); Multiplexing and channel coding," 3GPP TS 36.212 V10.4.0 (2011-2012), 2011, pp. 1-78.

3GPP Organizational Partners, "Evolved Universal Terrestrial Radio Access (E-UTRA); Physical layer procedures," 3GPP TS 36.213 V10.4.0 (2011-2012), 2011, pp. 1-125.

Catt, "HARQ and Cross-carrier Scheduling for Different TDD Configurations," 3GPP TSG RAN WG2 Meeting 74, May 9-13, 2011, pp. 1-3.

Catt, "Consideration on Different TDD Configuration," 3GPP TSG RAN WG2 Meeting 74, May 9-13, 2011, pp. 1-2.

Renesas Mobile Europe, "Operation Principles of CC specific TDD Configuration," 3GPP TSG RAN WG2 Meeting 74, May 9-13, 2011, pp. 1-3.

Nokia Siemens Networks, Nokia Corporation, "Cell specific TDD configuration with inter-band CA," 3GPP TSG RAN WG2 Meeting 74, May 9-13, 2011, pp. 1-4.

Intel Corporation, "Support of Mixed Inter-Band TDD Configurations in Rel-11 CA," 3GPP TSG RAN WG2 Meeting 74, May 9-13, 2011, pp. 1-3.

"Office Action of China Counterpart Application", issued on Aug. 27, 2014, p. 1-p. 9.

* cited by examiner

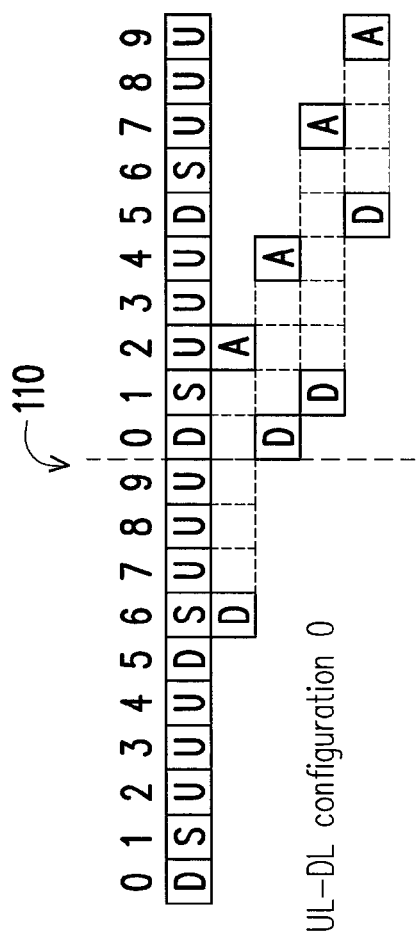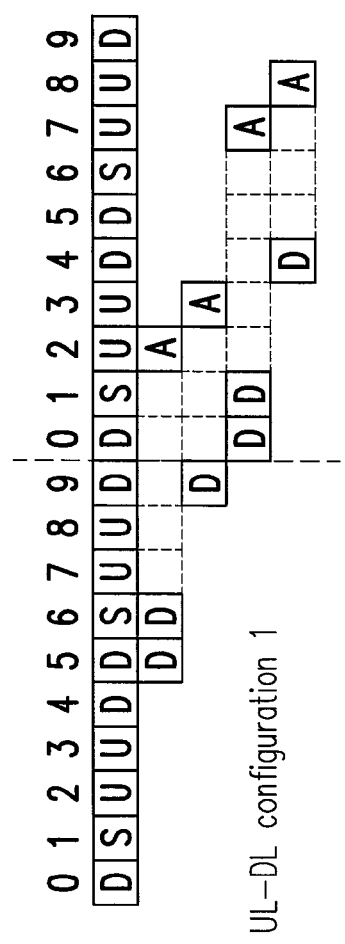
FIG. 1A
FIG. 1B

UL-DL configuration 4

FIG. 1F

UL-DL configuration 5

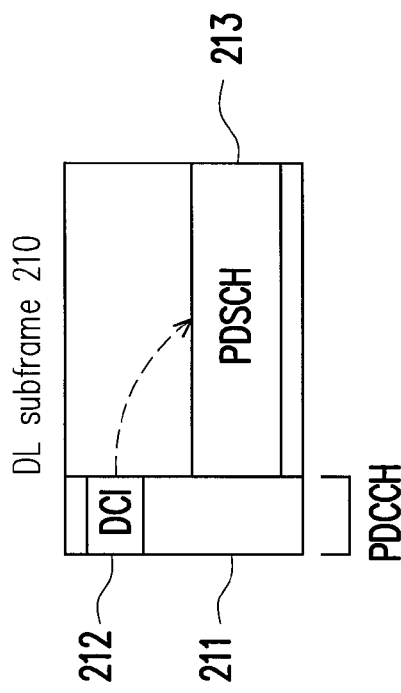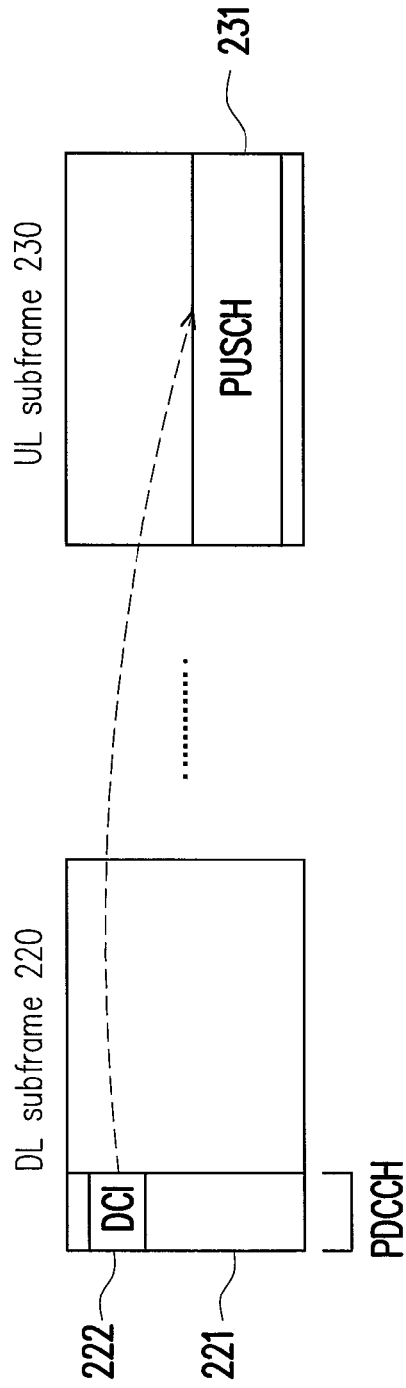
FIG. 2A
FIG. 2B

TDD WIRELESS COMMUNICATION SYSTEM AND METHOD FOR REPORTING HARQ-ACK

CROSS-REFERENCE TO RELATED APPLICATION

This application claims the priority benefits of U.S. provisional application Ser. No. 61/515,336, filed on Aug. 5, 2011 and Taiwan application serial no. 101123902, filed on Jul. 3, 2012. The entirety of each of the above-mentioned patent applications is hereby incorporated by reference herein and made a part of this specification.

TECHNICAL FIELD

The disclosure is directed to a method for reporting a hybrid automatic repeat request acknowledgement (HARQ-ACK) applicable to a time-division duplex (TDD) wireless communication system.

BACKGROUND

Mobile communication devices, such as smart phones and tablet computers have become essentials in the modern life. A time-division duplex long term evolution (TDD-LTE) standard is one of the latest wireless communication system configurations. In a TDD-LTE system, a mobile communication device of a user is referred to as a user equipment (UE). A technique of orthogonal frequency-division multiplexing (OFDM) is adopted for signal generation of the TDD-LTE. One of the OFDM features lies in transmission using a plurality of sub-carriers, and these sub-carriers correspond to a serving cell.

In a TDD-LTE system, downlink information from a base station may be received by a UE through one or more serving cells, or uplink information may be transmitted to the base station from a UE. Time resources for each serving cell are partitioned chronologically as a plurality of frames. Each frame is partitioned as 10 subframes, and subframes in each frame are numbered 0 through 9. Each frame includes three types of subframes, which are downlink subframe (DL subframe), uplink subframe (UL subframe) and special subframe. Table 1 below illustrates various types of UL-DL configurations of the TDD-LTE standard.

TABLE 1

| UL-DL configurations of the TDD-LTE standard | | | | | | | | | | |
|---|---|---|---|---|---|---|---|---|---|---|
| UL-DL | Subframe No. | | | | | | | | | |
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 1 lists seven types of UL-DL configurations of the TDD-LTE standard, which are numbered 0 through 6. Depending on requirements, the base station may determine an UL-DL configuration corresponding to a serving cell for setting a subframe type for the serving cell. In Table 1, each box under subframe Nos. 0 through 9 represents a subframe, wherein D, S or U respectively represents that the subframe is defined as a DL subframe, a special subframe, or an UL subframe. For example, when the base station determines a certain serving cell to adopt UL-DL configuration 3, subframe No. 0 of the serving cell is defined as a DL subframe, subframe No. 1 is defined as a special subframe, subframe Nos. 2 through 4 are defined as UL subframes, and subframe Nos. 5 through 9 are defined as DL subframes, and the other UL-DL configurations do so likewise. The special subframe (S) has several configurations provided for the base station to determine whether to transmit downlink information in the subframe to the UE. If the configurations of the subframe can support to transmit downlink information to the UE, then the special subframe may simply considered as a DL subframe (D) in the disclosure. Thus, UL/DL ratio of the UL-DL configurations may be configured as from 2:3 to 9:1 and so on. The base station determines the UL-DL configuration used by the serving cell according to the UL/DL ratio required by the UEs served by one serving cell.

The HARQ is a mechanism used for increasing information transmission efficiency in a wireless communication system. In such mechanism, if information in a DL subframe can be successfully received by a UE from the base station, the UE reports a corresponding positive acknowledgement (ACK) to the base station. If, due to certain reasons such as bad communication quality, information in a DL subframe cannot be successfully received by a UE from the base station, the UE reports a corresponding negative acknowledgement (NACK) to the base station. When a NACK is received by the base station, the information corresponding to the NACK will be transmitted again to the UE sending the NACK. The aforementioned ACK and the NACK are collectively referred to as HARQ-ACK.

HARQ-ACK reporting is regulated by a certain time requirement. Some UL subframes have corresponding downlink (DL) association sets thereof. The DL association set is composed of at least one DL subframe chronologically before the UL subframe in the same serving cell. If downlink information from base station is received by a UE in a DL association set corresponding to a UL subframe, the UE has to perform the HARQ-ACK report regarding the downlink information to the base station in the UL subframe.

Table 2 below illustrates corresponding relationship between an UL subframe and a DL association set of each UL-DL configuration. FIG. 1A through FIG. 1G are schematic diagrams illustrating the corresponding relationship between the UL subframe and the DL association set of a TDD-LTE system.

TABLE 2

The schematic diagram of the corresponding relationship between the UL subframe and the DL association set of the TDD-LTE system.

| UL-DL configuration | Subframe No. | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Each row in Table 2 corresponds to a UL-DL configuration, i.e. UL-DL configurations 0 through 6, respectively, and each line in Table 2 corresponds to a subframe, i.e. subframe Nos. 0 through 9. If a grid shows "-", it represents that a corresponding subframe thereof is a DL subframe or an UL subframe having no corresponding DL association set. If a grid shows one or more digits, each of the digits indicates that a location of a DL subframe in a DL association set, and the locations of the DL subframes are also illustrated in FIG. 1A through FIG. 1G. FIG. 1A through FIG. 1G correspond to the UL-DL configurations 0 through 6, respectively.

In FIG. 1A through FIG. 1G, two frames are illustrated, respectively. A vertical dotted line in the center as illustrated in each diagram represents a separation of the two sequential frames. For example, a vertical dotted line 110 in the center as illustrated in FIG. 1A is a separation of two sequential frames based on UL-DL configuration 0. Grids of the row on top in FIG. 1A through FIG. 1G represents the same UL-DL configurations as Table 1, while grids of each row under the UL-DL configurations illustrates an UL subframe and its corresponding DL association set, wherein the UL subframe is labeled as "A", and "A" represents the acknowledgement(s) to be reported by the UE. Each DL subframe of the DL association set is labeled as "D". The corresponding relationship of the UL subframes and their DL association sets is also illustrated in Table 2.

Taking the UL-DL configuration 0 depicted in FIG. 1A for example, one DL subframe is included in the DL association set of the UL subframe 2, i.e. the sixth subframe chronologically before the UL subframe 2. One DL subframe is included in the DL association set of the UL subframe 4, i.e. the fourth subframe chronologically before the UL subframe 4. One DL subframe is included in the DL association set of the UL subframe 7, i.e. the sixth subframe chronologically before the UL subframe 7. One DL subframe is included in the DL association set of the UL subframe 9, i.e. the fourth subframe chronologically before the UL subframe 9.

Taking the UL-DL configuration 1 depicted in FIG. 1B for example, two DL subframes are included in the DL association set of the UL subframe 2, i.e. the sixth and the seventh subframes chronologically before the UL subframe 2, respectively. One DL subframe is included in the DL association set of the UL subframe 3, i.e. the fourth subframe chronologically before the UL subframe 3. Two DL subframes are included in the DL association set of the UL subframe 7, i.e. the sixth and the seventh subframes chronologically before the subframe 7. One DL subframe is included in the DL association set of the UL subframe 8, i.e. the fourth subframe chronologically before the UL subframe 8.

Taking the UL-DL configuration 2 depicted in FIG. 1C for example, four DL subframes are included in the DL association set of the UL subframe 2, i.e. the fourth and the sixth through the eighth subframes chronologically before the UL subframe 2, respectively. Samely, four DL subframes are included in the DL association set of the UL subframe 7, i.e. the fourth and the sixth through the eighth subframes chronologically before the UL subframe 7.

UL-DL configurations 3 through 6 are illustrated likewise in FIG. 1D through FIG. 1G, which can be inferred based on above examples and will not be repeatedly described hereinafter.

FIG. 2A and FIG. 2B are schematic diagrams of the DL subframes and the subframes of the aforementioned TDD-LTE system. When a base station intents to transmit downlink information to a UE, as shown in FIG. 2A, the base station uses a DL subframe 210 for downlink assignment. The base station first transmits a physical downlink control channel (PDCCH) 211 in the DL subframe 210 and then, transmits a physical downlink shared channel (PDSCH) 213. The PDCCH 211 includes downlink assignment downlink control information (DL assignment DCI) 212, which is used for informing the UE that downlink information from the base station is waiting for being received by the UE in the PDSCH 213.

Among the PDSCHs received by the UE from the base station, some PDSCHs may be used for broadcasting of system information, and it is not required for the UE to perform the HARQ-ACK report for receiving such PDSCHs. For any UE, the HARQ-ACK report is necessary to inform base station whether the downlink information can be successfully received only when the UE receives UE-specific downlink information.

If the PDSCH 213 of the DL subframe 210 is a UE-specific PDSCH, then the DL assignment DCI 212 includes a downlink assignment index, which is represented as $V_{DAI}^{DL}$ hereinafter. $V_{DAI}^{DL}$ is a value and transmitted to inform the UE of assigned numbers of such information in the DL subframe 210.

When the base station intents to assign uplink resource to a UE, as shown in FIG. 2B, the base station uses a DL subframe 220 for uplink grant. The base station transmits a PDCCH 221 in the DL subframe 220. The PDCCH 221 includes uplink grant downlink control information (UL grant DCI) 222. The UL grant DCI 222 is used for informing the UE that uplink information can be transmitted to the base station in a physical uplink shared channel (PUSCH) 231 of a following UL subframe 230. If the UE receives the downlink information via PDSCH in the DL subframe of the DL association set corresponding to the UL subframe 230, the UE is required to perform HARQ-ACK report of the DL subframes in the PUSCH 231. In addition, the UL grant DCI 222 includes a downlink assignment index $W_{DAI}^{UL}$. $W_{DAI}^{UL}$ is a value and is transmitted to inform the UE that there are $W_{DAI}^{UL}$ DL subframes whose HARQ-ACKs have to be reported in the PUSCH 231.

Carrier aggregation is a mechanism utilized for increasing the bandwidth of a wireless communication system. The UE supporting carrier aggregation may use a plurality of component carriers corresponding to a plurality of serving cells to transmit or receive information simultaneously so as to expand effective bandwidth for the UE.

FIG. 3 is a schematic diagram of a method of HARQ-ACK reporting applicable to a TDD-LTE system supporting the carrier aggregation. In the example as illustrated in FIG. 3, the UE may transmit or receive information simultaneously in three serving cells 320~322, and the three serving cells 320~322 use the same UL-DL configuration, i.e. the UL-DL configuration 2. Each of the serving cells 320~322 are assigned a number c, which is 0, 1 and 2, respectively. In FIG. 3, five rows of grids are illustrated, wherein two frames based on the UL-DL configuration 2 are illustrated in the top row, while a subframe 301 and its corresponding DL association set are illustrated in the second row. Downlink information received by the UE in the serving cells 320~322 and the HARQ-ACKs reported by the UE are respectively illustrated in the lower three rows.

The base station transmits downlink information via three DL subframes in the serving cell 320 to the UE, and the downlink assignment indexes $V_{DAI,0}^{DL}$ of the three DL subframes are 1, 2 and 3, respectively. Due to bad communication quality, the downlink information of the first subframe is missed by the UE (the UE misses the detection of the corresponding downlink assignment DCI), and the grid is labeled with "X" in the diagram. Further, downlink information of the following two DL subframes can be received by the UE. The base station transmits the downlink information via two subframes in the serving cell 321 to the UE. The downlink assignment indexes $V_{DAI,1}^{DL}$ of the two subframes are 1 and 2, respectively. The base station transmits downlink information via one subframe in the serving cell 322 to the UE. The downlink assignment index $V_{DAI,2}^{DL}$ of the subframe is 1. Downlink information of the three subframes can be received by the UE in the serving cells 321 and 322.

In the TDD-LTE system supporting the carrier aggregation, acknowledgements of all serving cells are reported to the base station in a UL subframe via one of the serving cells. For example, in the example illustrated in FIG. 3, the base station provides an upload grant in a subframe 302 of the serving cell 320 (i.e. the last subframe of a DL association set of the subframe 301), specifies the UE to transmit uplink information according to the instruction of the uplink grant in the subframe 301 of the serving cell 320 and reports all HARQ-ACKs of the three serving cells 320~322. The base station also provides a downlink assignment index $W_{DAI}^{UL}$ to the UE in the uplink grant of the subframe 302 of the serving cell 320. Differing from the scenario of only single serving cell, when there is a plurality of serving cells, $W_{DAI}^{UL}$ is applicable to each serving cell, and in the example illustrated in FIG. 3, $W_{DAI}^{UL}$ is equal to 3.

In the example illustrated in FIG. 3, the UE uses a configuration of a physical uplink control channel format 3 (PUCCH format 3) in the PUSCH of the UL subframe 301 of the serving cell 320 to report the HARQ-ACK. The UE have to report HARQ-ACKs of $W_{DAI}^{UL}$ subframes for each serving cell. Taking the example illustrated in FIG. 3 for instance, HARQ-ACKs of nine DL subframes in total is required to be reported, which may be represented as $[AN_{0,1}, AN_{0,2}, AN_{0,3}, AN_{1,1}, AN_{1,2}, AN_{1,3}, AN_{2,1}, AN_{2,2}, AN_{2,3}]$, wherein $[AN_{0,1}, AN_{0,2}, AN_{0,3}]$ are HARQ-ACKs of three DL subframes of the serving cell 320. Since information of the first DL subframe is missed by the UE, $AN_{0,1}$ represents a negative ACK of a missed reception, while $AN_{0,2}$ and $AN_{0,3}$ are HARQ-ACKs representing whether downlink information is successfully received. $[AN_{1,1}, AN_{1,2}, AN_{1,3}]$ are HARQ-ACKs of the three DL subframes of the serving cell 321. Since the base station actually transmits downlink information via two DL subframes in the serving cell 321, while $AN_{1,1}$, and $AN_{1,2}$ are HARQ-ACKs representing whether the information is successfully received, and $AN_{1,3}$ is a negative ACK representing no downlink information. $[AN_{2,1}, AN_{2,2}, AN_{2,3}]$ are HARQ-ACKs of three DL subframes of the serving cell 322. Since the base station actually transmits downlink information of a subframe only in the serving cell 322, $AN_{3,1}$ is the HARQ-ACK representing whether the downlink information has been successfully received, while $AN_{3,2}$ and $AN_{3,3}$ are negative ACKs representing no downlink information.

SUMMARY

The disclosure is directed to a method for reporting hybrid automatic repeat request acknowledgement (HARQ-ACK) and a time-division duplex (TDD) wireless communication system capable of reporting the HARQ-ACK in an application supporting carrier aggregation.

The disclosure is directed to a method for reporting a HARQ-ACK applicable to a TDD wireless communication system. The method includes steps of receiving downlink information from a base station with multiple serving cells of the TDD wireless communication system, wherein the multiple serving cells uses multiple uplink-downlink configurations, calculating a report number of each serving cell, wherein the report number is a number of downlink subframes of the corresponding serving cell whose acknowledgements have to be reported, and the report number of at least one of the serving cells is determined according to a downlink (DL) association set of an uplink subframe specified by the base station in the serving cell and providing report information to the base station in the uplink subframe of one of the multiple serving cells specified by the base station, wherein the report information comprises the acknowledgements that have to be reported for each of the serving cells.

The disclosure is further directed to a TDD wireless communication system including a base station and a user equipment (UE). The base station transmits downlink information in multiple serving cells of the TDD wireless communication system and specifies an uplink subframe of one of the serving cells, wherein the multiple serving cells use multiple uplink-downlink configurations. The UE is configured to receive the information, calculate the report number of each serving cell. The report number is a number of downlink subframes of the corresponding serving cell whose acknowledgements have to be reported. The UE is configured to provide report information to the base station in the uplink subframe of the serving cell specified by the base station. The report information includes acknowledgements that have to be reported for each serving cell. The report number of at least one of the serving cells is determined according to the DL association set of the uplink subframe of the same serving cell.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figures 1C, 1D:
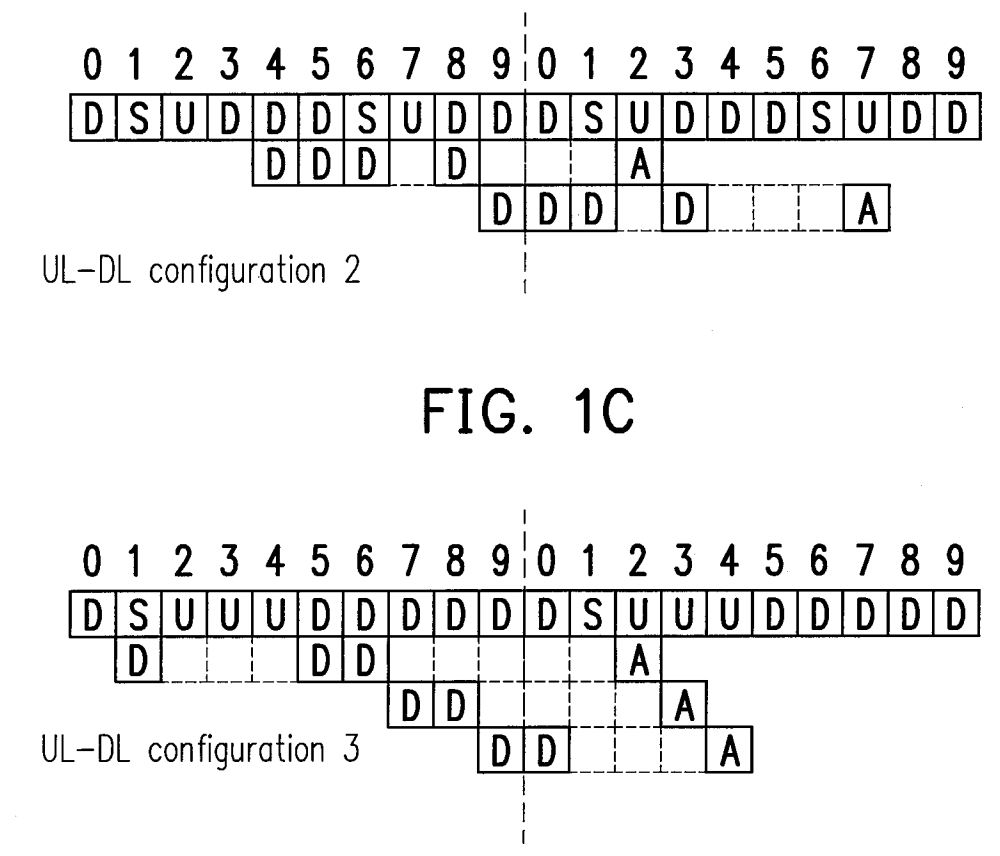
Figures 1E, 1F:
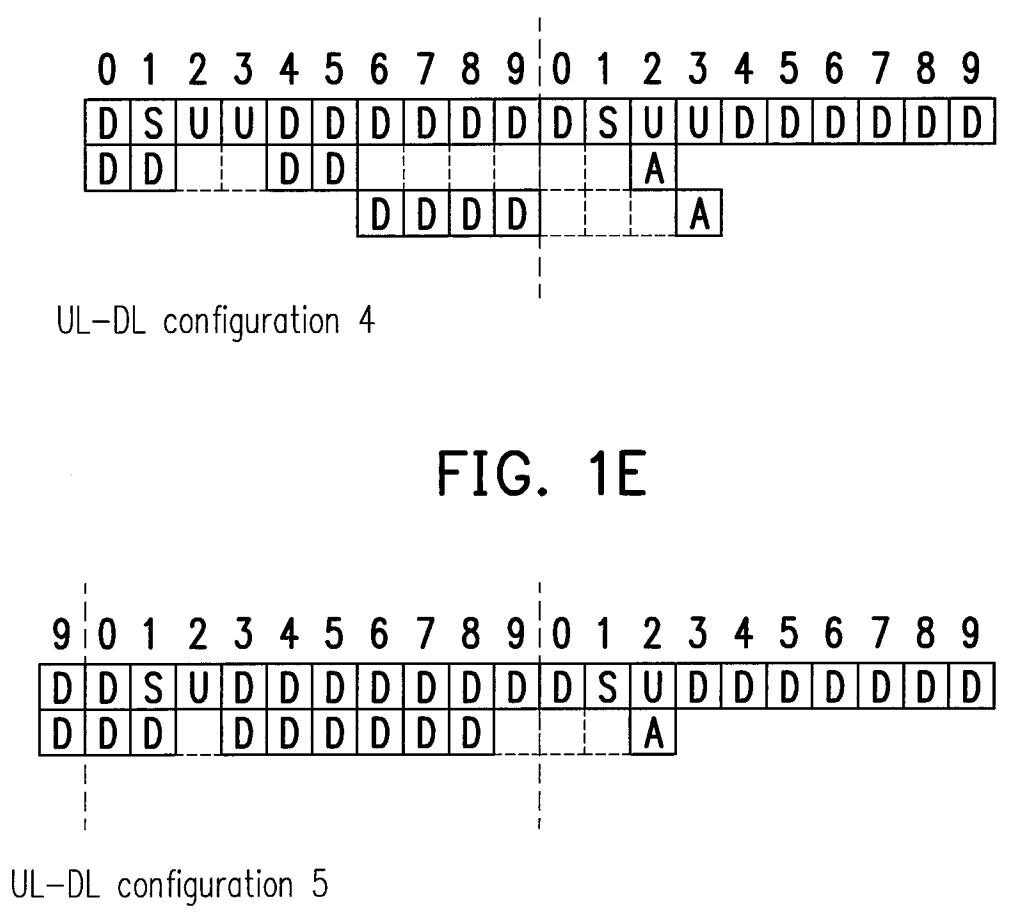

FIG. 1A through FIG. 1G are schematic diagrams illustrating a corresponding relationship between uplink subframes and downlink (DL) association set of a time-division duplex long term evolution (TDD-LTE) system in the related art.

FIG. 2A and FIG. 2B are schematic diagrams illustrating downlink subframes and uplink subframes of a time-division duplex in the related art.

DESCRIPTION OF EMBODIMENTS

Figure 1G:
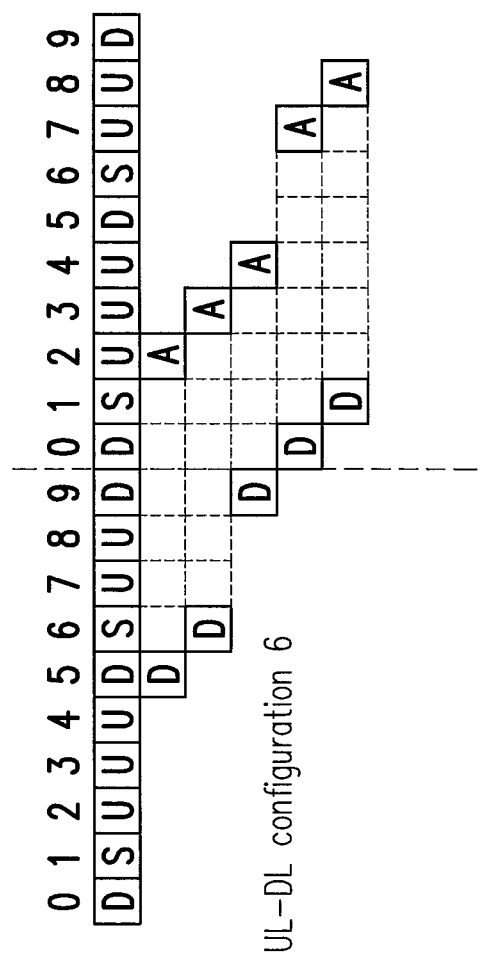
Figure 3:
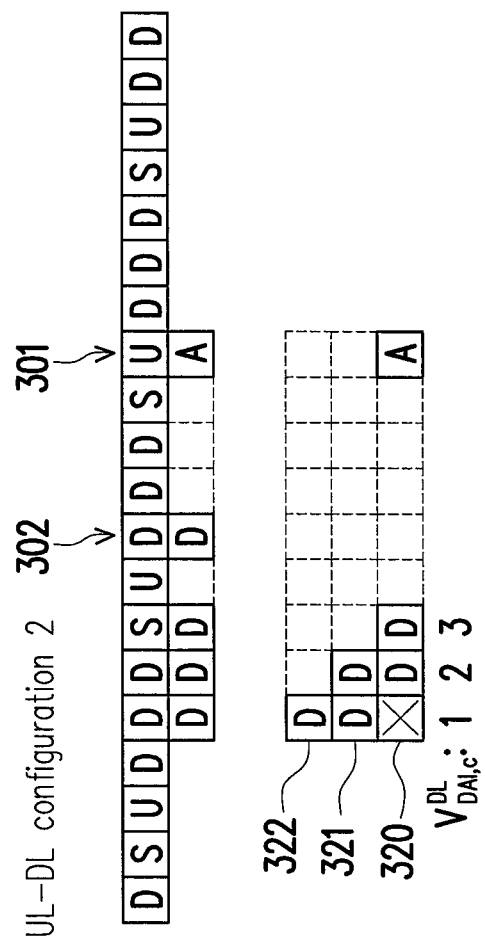
FIG. 3 is a schematic diagram of a method for reporting hybrid automatic repeat request acknowledgement (HARQ-ACK) applicable to a TDD-LTE system in the related art.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 4A:
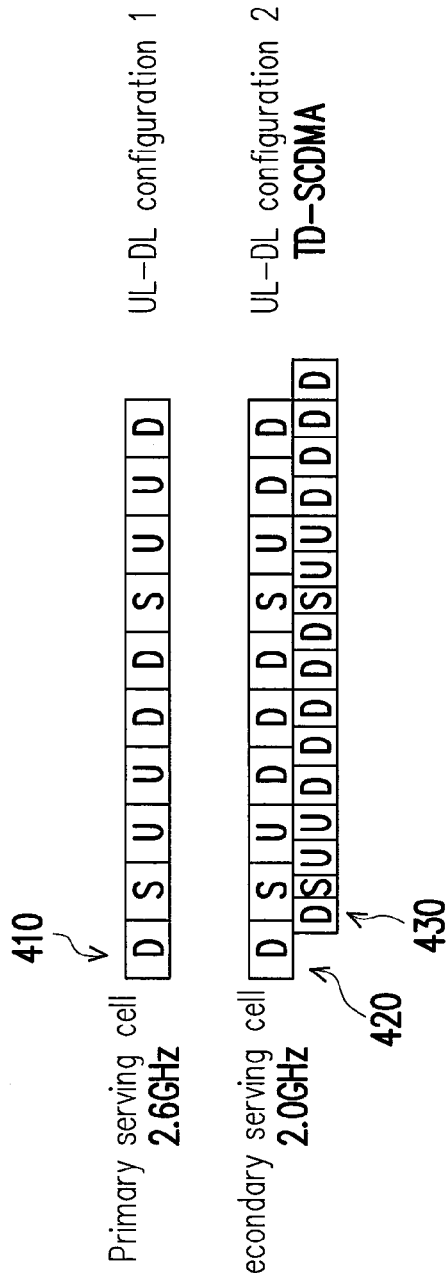
FIG. 4A and FIG. 4B are schematic diagrams illustrating uplink-downlink configurations of a time-division duplex (TDD) wireless communication system according to an embodiment of the disclosure.

In some application environments, to allow different serving cells to use different uplink-downlink (UL-DL) configurations is necessary. For example, referring to FIG. 4A, a carrier aggregation system has a primary serving cell 410 and a secondary serving cell 420. The primary serving cell 410 is configured to use the UL-DL configuration 1 and deployed in the 2.6 GHz frequency band. The secondary serving cell 420 is configured to use the UL-DL configuration 2 and deployed in the 2.0 GHz frequency band. In the area where the carrier aggregation system is located, there is an earlier established wireless communication system which has a serving cell 430 using an UL-DL configuration of time division synchronous code division multiple access (TD-SCDMA).

Typically, a base station of the carrier aggregation system may allow both the primary serving cell 410 and the secondary serving cell 420 to use the UL-DL configuration 1. However, both the serving cell 430 and the secondary serving cell 420 of the carrier aggregation system are deployed in the same frequency band. To avoid interference occurring between uplink and downlink of the serving cells 420 and 430, the base station of the carrier aggregation system is forced to use the UL-DL configuration 2 in the secondary serving cell 420 so as to align uplink and downlink time of the serving cells 420 and 430 as much as possible.

Figure 4B:
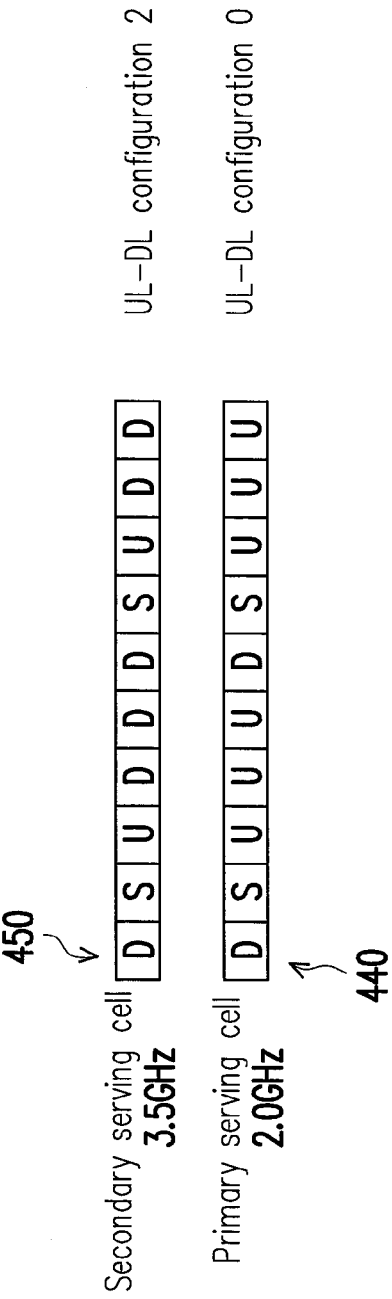

Another intention to use different UL-DL configurations is for improving uplink capability of a user equipment (UE). The UE of the wireless communication system is typically a mobile communication device using a battery for power supply, such as a smart phone, a tablet computer or the like. A wireless signal has greater attenuation in a high frequency, and thus, to save battery power of the UE, a UL-DL configuration with more uplink (UL) subframes should be applied in a serving cell in lower frequency band, and a UL-DL configuration with more downlink (DL) subframes should be applied in a serving cell in higher frequency band. As shown in FIG. 4B, a carrier aggregation system depicted in FIG. 4B has a primary serving cell 440 and a secondary serving cell 450. The primary serving cell 440 is configured to use the UL-DL configuration 0 and deployed in the 2.0 GHz frequency band. The secondary serving cell 450 is configured to use the UL-DL configuration 2 and deployed in the 3.5 GHz frequency band. A frequency of the primary serving cell 440 is lower than that of the secondary serving cell 450, and the primary serving cell 440 contains more UL subframes than the secondary serving cell 450 does.

Accordingly, a time-division duplex (TDD) wireless communication system supporting carrier aggregation is introduced by the disclosure, and multiple serving cells thereof may use the same or different UL-DL configurations. The TDD wireless communication system of the disclosure may be a time-division duplex long term evolution (TDD-LTE) system or the like.

Figure 5:
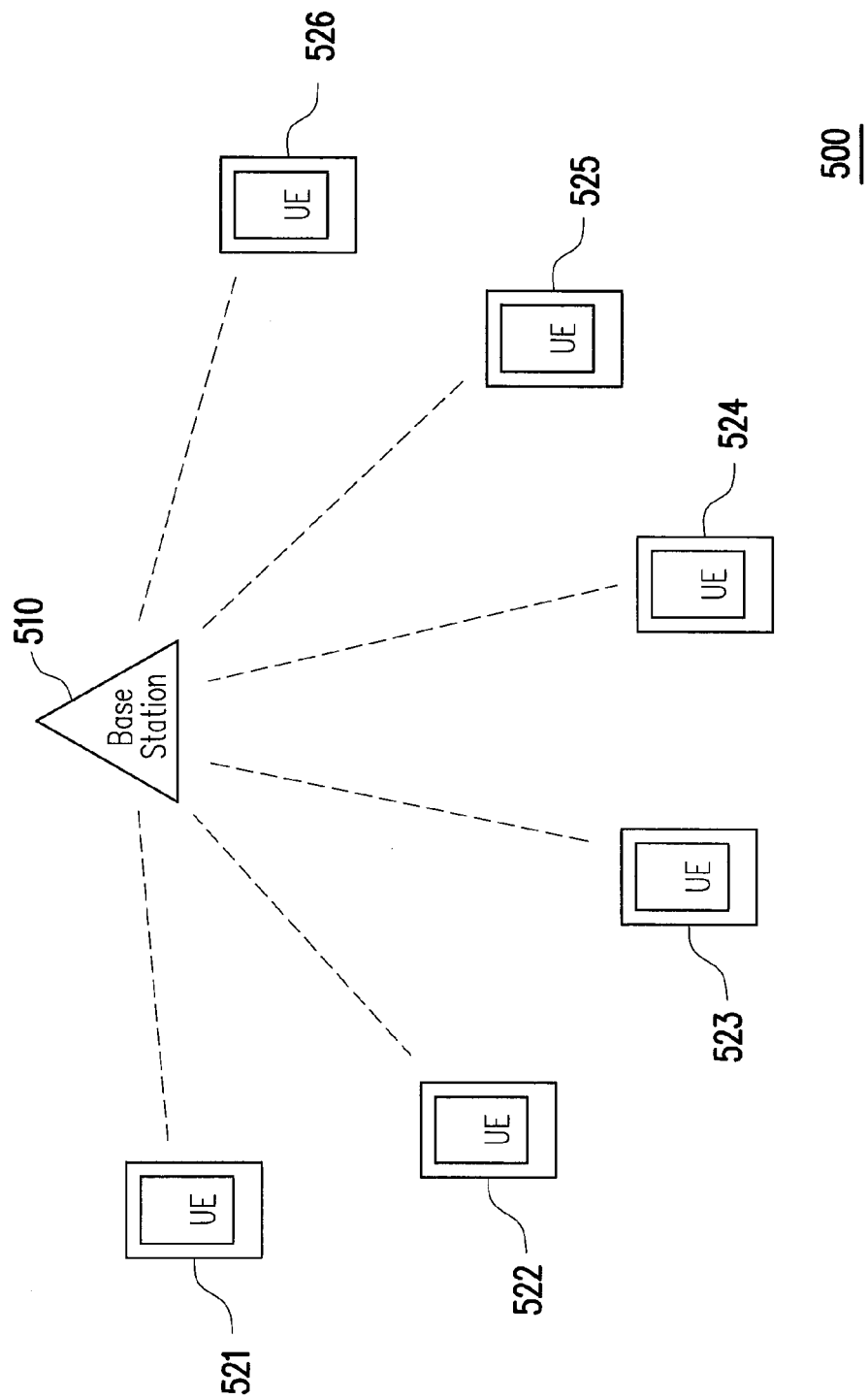
FIG. 5 is a schematic diagram illustrating a TDD system according to an embodiment of the disclosure.

FIG. 5 is a schematic diagram illustrating a TDD wireless communication system 500 according to an embodiment of the disclosure. The TDD wireless communication system 500 includes a base station 510 and user equipments (UEs) 521~526. For each of the UEs 521~526, the base station 510 may transmit downlink information to the UE in multiple serving cells and specify a UL subframe of one of the serving cells for UE to transmit uplink information and report HARQ-ACK to the base station 510. Each of the UEs 521~526 may perform a method for reporting the hybrid automatic repeat request acknowledgement (HARQ-ACK) to report acknowledgements to the base station 510.

Figure 6:
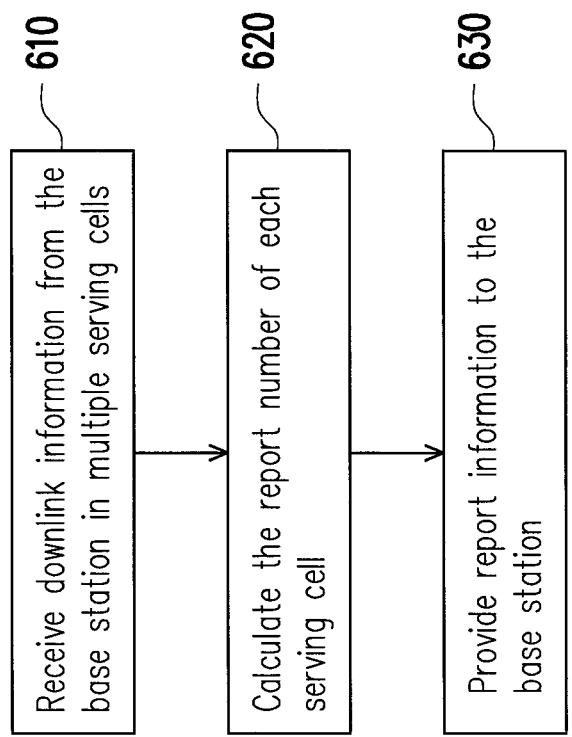
FIG. 6 is a flowchart of a method for HARQ-ACK reporting according to an embodiment of the disclosure.

FIG. 6 is a flowchart of a method for reporting a HARQ-ACK according to an embodiment of the disclosure. In step 610, downlink information from the base station is received in multiple serving cells. In step 620, a report number of each serving cell is calculated. The disclosure uses DL subframes as basic units for the report of HARQ-ACK, and thus, the report number is the number of the DL subframes of the corresponding serving cell whose HARQ-ACKs have to be reported.

As described below, given that physical downlink shared channels (PDSCHs) received by the UEs in the DL subframes are all PDSCHs specific to the UEs, and thus, each DL subframe containing the downlink information is required to report the HARQ-ACK to the base station.

In step 630, the UE provides report information to the base station in the UL subframe of the serving cell specified by the base station. The report information includes the HARQ-ACKs that have to be reported for each serving cell. The number of the HARQ-ACKs of at least one of the serving cells is determined according to a downlink (DL) association set of an uplink subframe in the same serving cell. Calculation of the report number in step 620 and the report information of step 630 will be described hereinafter.

In an embodiment of the disclosure (hereinafter as embodiment A), the multiple serving cells may be separated as two parts. For example, the first part includes the serving cells among the multiple serving cells having the same UL-DL configuration as that of the serving cell specified by the base station to transmit the uplink information, and the second part includes the serving cells among the multiple serving cells having different UL-DL configurations from that of the serving cell specified by the base station to transmit the uplink information.

These two parts of serving cells use different methods to calculate the report number. For example, a report number $B_c^{DL}$ of each serving cell c of the first part may be equal to a downlink assignment index $W_{DAI}^{UL}$ provided by the base station. The base station may use a DL subframe for providing an uplink grant in a serving cell specified thereby. Based on the downlink control information (DCI) of the uplink grant (UL grant DCI), a UL subframe in the serving cell specified by the base station is specified. The UE has to report HARQ-ACKs of all serving cells to the base station in the specified subframe of the specified serving cell. $W_{DAI}^{UL}$ is the downlink assignment index in the UL grant DCI. $W_{DAI}^{UL}$ of embodiment A may be the maximum value in the downlink assignment $V_{DAI,c}^{DL}$ of multiple DL assignment DCI provided in each serving cell c of the first part by the base station.

A report number $B_c^{DL}$ of each serving cell c of the second part may be determined according to a value $W_{DAI}^{UE}$ calculated by the UE and the DL association set corresponding to the UL subframe specified by the base station in the serving cell c. For example, the value $W_{DAI}^{UE}$ may be the maximum value in the downlink assignment indexes $V_{DAI,c}^{DL}$ of multiple DL assignment DCI provided in each serving cell c of the second part by the base station. As for how to determine the report number $B_c^{DL}$ of each serving cell c of the second part, for example, a formula as follows may be used, $$B_c^{DL} = \min\{W_{DAI}^{UE}, M_c\},$$

where min{ } is a minimum operator. The value $M_c$ of the serving cell c may be generated according to the DL association set of the serving cell c. For example, $M_c$ may be equal to the number of subframes of the DL association set of the serving cell c.

Figure 7:
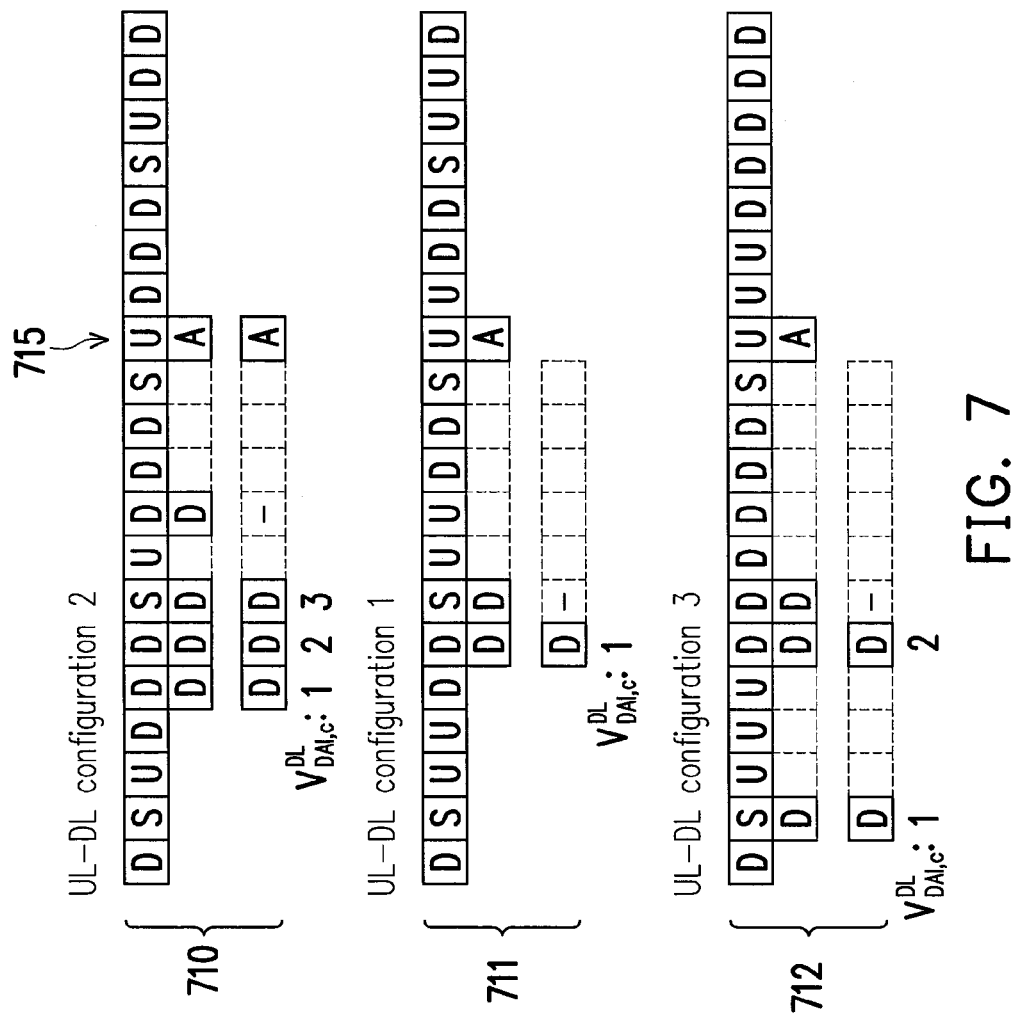
FIG. 7, FIG. 8 and FIG. 9 are schematic diagrams of HARQ-ACK reporting in a TDD wireless communication system according to different embodiments of the disclosure.

Referring to FIG. 7 hereinafter, an example of the embodiment A is described. The UE of FIG. 7 uses three serving cells 710, 711 and 712. The three serving cells respectively use the UL-DL configurations 2, 1 and 3. Each of the serving cells 710~712 is assigned a number c, which is 0, 1 and 2, respectively. Each serving cell is illustrated by three rows of grids, wherein the first row is a subframe sequence regulated by its UL-DL configuration, which is also illustrated as Table 1. The second row of each serving cell illustrates an UL subframe 715 for HARQ-ACK reporting and the DL association sets corresponding to the UL subframe 715. In different UL-DL configurations, the UL subframe 715 may correspond to different DL association sets. The third row illustrates which DL subframes are used by the base station to transmit downlink information to the UE in each serving cell. Grids labeled with "D" in the third row of each serving cell represent the subframes used by the base station to transmit downlink information, while grids labeled with "-" represent that the base station does not use the subframes to transmit downlink information.

In this example, the base station specifies the UL subframe 715 of the serving cell 710 for the UE to transmit uplink information and report all HARQ-ACKs of the serving cells 710~712. Thus, the serving cells are separated as two parts. The first part only includes the serving cell 710, and the second part includes the serving cells 711 and 712. The base station transmits downlink information via three subframes in the serving cell 710. The downlink assignment indexes $V_{DAI,0}^{DL}$ corresponding to the downlink information are 1, 2, and 3, respectively. Accordingly, the downlink assignment index $W_{DAI}^{UL}$ of the first part is equal to 3, and the report number $B_0^{DL}$ of the serving cell 710 is calculated as follows: $B_0^{DL} = W_{DAI}^{UL} = 3$.

The base station only transmits downlink information via one subframe in the serving cell 711, and the corresponding downlink assignment index $V_{DAI,1}^{DL}$ is 1. The base station transmits downlink information via two subframes in the serving cell 712, and the downlink assignment indexes $V_{DAI,2}^{DL}$ corresponding to the downlink information are 1 and 2, respectively. Accordingly, the value $W_{DAI}^{UE}$ of the second part is equal to 2. The value $M_c$ of the present example is equal to the number of DL subframes in the DL association set associated with the UL subframe 715 in each serving cell c. Thus, $M_1$ of the serving cell 711 is equal to 2, and $M_2$ of the serving cell 712 is equal to 3. Based on the foregoing, it can be known that the report number $B_1^{DL}$ of the serving cell 711 is calculated as follows: $B_1^{DL} = \min\{W_{DAI}^{UE}, M_1\} = \min\{2, 2\} = 2$. The report number $B_2^{DL}$ of the serving cell 712 is calculated as follows: $B_2^{DL} = \min\{W_{DAI}^{UE}, M_2\} = \min\{2, 3\} = 2$.

The UE of the present example uses a physical uplink control channel format 3 (PUCCH format 3) to provide report information to the base station in a physical uplink shared channel (PUSCH) of the UL subframe 715 of the serving cell 710 specified by the base station. The report information may be represented as $[W_{DAI}^{UE}, A_0, A_1, A_2, A_3, \ldots, A_6]$. Since the second part does not have the corresponding value $W_{DAI}^{UL}$, $W_{DAI}^{UE}$ the second part has to be reported to the base station. The UE reports HARQ-ACKs of seven DL subframes in total, i.e. $A_0$ through $A_6$. $A_0$ through $A_2$ are HARQ-ACKs of the serving cell 710, and $A_3$ through $A_4$ are HARQ-ACKs of the serving cell 711, wherein $A_4$ is a negative ACK representing no downlink information, and $A_5$ and $A_6$ are HARQ-ACKs of two DL subframes corresponding to the serving cell 712.

In another embodiment of the disclosure (hereinafter as embodiment B), the report number $B_c^{DL}$ of each serving cell c is equal to $\min\{W_{DAI}^{UL}, M_c\}$, wherein the downlink assignment index $W_{DAI}^{UL}$ is the downlink assignment index of the UL grant DCI provided by the base station when specifying the serving cell and the UL subframe. $W_{DAI}^{UL}$ of the embodiment B may be the maximum value in the downlink assignment indexes $V_{DAI,c}^{DL}$ of multiple DL assignment DCI provided in each serving cell c by the base station. The value $M_c$ may be generated according to the DL association set corresponding to the UL subframe specified by the base station in each serving cell c.

An example of the embodiment B will be described with reference to FIG. 7 hereinafter. Details of FIG. 7 have been described in the embodiment A and will not be repeated hereinafter. In the present example, the downlink assignment index $W_{DAI}^{UL}$ provided by the base station is equal to 3. The value $M_c$ of each serving cell c is equal to the number of the subframes of the DL association set of the serving cell c. And for each serving cell c, the DL association set is corresponding to the UL subframe specified by the base station. Thus, values $M_0$, $M_1$ and $M_2$ of the serving cells 710, 711 and 712 are 4, 2 and 3, respectively. A report number $B_0^{DL}$ of the serving cell 710 is calculated as follows: $B_0^{DL} = \min\{W_{DAI}^{UL}, M_0\} = \min\{3, 4\} = 3$. A report number $B_1^{DL}$ of the serving cell 711 is calculated as follows: $B_1^{DL} = \min\{W_{DAI}^{UL}, M_1\} = \min\{3, 2\} = 2$. A report number $B_2^{DL}$ of the serving cell 712 is calculated as follows: $B_2^{DL} = \min\{W_{DAI}^{UL}, M_2\} = \min\{3, 3\} = 3$.

The UE of the present example also uses PUCCH format 3 to provide report information to the base station in the physical uplink shared channel (PUSCH) of the UL subframe 715 of the serving cell 710 specified by the base station. The report information may be represented as $[A_0, A_1, A_2, A_3, \ldots, A_7]$. The UE reports HARQ-ACKs of eight DL subframes in total, i.e. $A_0$ through $A_7$. $A_0$ through $A_2$ are HARQ-ACKs of the serving cell 710, while $A_3$ and $A_4$ are HARQ-ACKs of the serving cell 711, wherein $A_4$ is a negative ACK representing no downlink information. $A_5$ through $A_7$ are HARQ-ACKs of the serving cell 712.

In still another embodiment of the disclosure (hereinafter as embodiment C), the base station uses a semi-persistent UL grant to instruct the UE to transmit uplink information in a UL subframe per a constant period, and if downlink information from the PDSCH is received in the DL subframes of the DL association set corresponding to the UL subframe, the UE is required to report the HARQ-ACKs of the DL subframes at the same time. In the following periodical uplink transmissions, the base station provides neither the uplink grant nor the downlink assignment index $W_{DAI}^{UL}$ of the uplink grant. The report number $B_c^{DL}$ of each serving cell c is equal to $\min\{W_{DAI}^{UE}, M_c\}$. The value $W_{DAI}^{UE}$ calculated by the UE is the maximum value in the downlink assignment indexes $V_{DAI,c}^{DL}$ of the multiple DL assignment DCI successfully received in each serving cell c by the UE from the base station. The value $M_c$ may be generated according to the DL association set corresponding to the UL subframe specified by the base station in each serving cell c.

An example of the embodiment C will be described with reference to FIG. 8 hereinafter. The UE in the present example uses two serving cells. A serving cell 810 uses the UL-DL configuration 6, while a serving cell 811 uses the UL-DL configuration 3. Each of the serving cells 810 and 811 is assigned as number c, which is 0 and 1, respectively. Each serving cell is illustrated by three rows of grids, which is in the same way as the illustration in FIG. 7 and will not be described repeatedly. The base station transmits downlink information via one DL subframe to the UE in the serving cell 810, and the downlink assignment index $V_{DAI,0}^{DL}$ corresponding to the downlink information is 1. The base station transmits downlink information via two downlink subframes to the UE in the serving cell 811, and each downlink assignment indexes $V_{DAI,0}^{DL}$ corresponding to the downlink information are 1 and 2, respectively. Accordingly, the value $W_{DAI}^{UE}$ of the present example is equal to 2. The value $M_c$ of the present example is equal to a number of the subframes of a DL association set corresponding to the UL subframe 815 specified by the base station in each serving cell c. Thus, the value $M_0$ of the serving cell 810 is equal to 1, and the value $M_1$ of the serving cell 811 is equal to 3. A report number $B_0^{DL}$ of the serving cell 810 is calculated as follows: $B_0^{DL} = \min\{W_{DAI}^{UE}, M_0\} = \min\{2, 1\} = 1$. A report number $B_1^{DL}$ of the serving cell 811 is calculated as follows: $B_1^{DL} = \min\{W_{DAI}^{UE}, M_1\} = \min\{2, 3\} = 2$.

The UE of the present example uses the physical uplink control channel format 3 (PUCCH format 3) to provide report information to the base station in a physical uplink shared channel (PUSCH) of the UL subframe 815 of the serving cell 810 specified by the base station. The report information may be represented as $[W_{DAI}^{UE}, A_0, A_1, A_2]$. Since no $W_{DAI}^{UL}$ is provided in the embodiment C, $W_{DAI}^{UE}$ has to be reported to the base station. The UE reports HARQ-ACKs of three DL subframes in total, wherein $A_0$ is a HARQ-ACK of a DL subframe of the serving cell 810, while $A_1$ and $A_2$ are HARQ-ACKs of two DL subframes of the serving cell 811.

In another embodiment of the disclosure (hereinafter as embodiment D), base station also uses the semi-persistent UL grant to instruct the UE to transmit uplink information in a UL subframe per a constant period. In the following periodical uplink, the base station provides neither the uplink grant nor the downlink assignment index $W_{DAI}^{UL}$ of the uplink grant. The report number $B_c^{DL}$ of each serving cell c is equal to the value $M_c$. As described above, the value $M_c$ may be determined according to the DL association set corresponding to the UL subframe specified by the base station in each serving cell c.

An example of the embodiment D will be described with reference to FIG. 8 hereinafter. Details of FIG. 8 have been described in the embodiment C and will not be repeated hereinafter. The value $M_M$ of the present example is equal to the number of the subframes of the DL association set corresponding to the UL subframe specified by the base station in each serving cell c, and thus, the value $M_0$ of the serving cell 810 is equal to 1, and the value $M_1$ of the serving cell 811 is equal to 3. The report number $B_0^{DL}$ of the serving cell 810 is calculated as follows: $B_0^{DL} = M_0 = 1$. The report number $B_1^{DL}$ of the serving cell 811 is calculated as follows: $B_1^{DL} = M_1 = 3$.

The UE of the present example uses PUCCH format 3 to provide report information to the base station in the physical uplink shared channel (PUSCH) of the UL subframe 815 of the serving cell 810 specified by the base station. The HARQ-ACK in the report information reported by the UE may be represented as $[A_0, A_1, A_2, A_3]$. The UE reports HARQ-ACKs of four DL subframes in total, wherein $A_0$ is the HARQ-ACK of the serving cell 810. $A_1$ through $A_3$ are HARQ-ACKs of the serving cell 811.

In the second parts of the embodiment A and the embodiment C, the value $W_{DAI}^{UE}$ is calculated based on an assumption that there is no semi-persistent subframe in the DL association set of each serving cell. However, in some embodiments, the base station can use a semi-persistent DL assignment to instruct the UE to receive information of a DL subframe in a certain serving cell c per a constant period. Such DL subframe is the aforementioned semi-persistent subframe. A semi-persistent downlink assignment does not include the PDCCH and therefore, does not include the downlink assignment index $V_{DAI,c}^{DL}$ of the DL assignment DCI.

Figure 9:
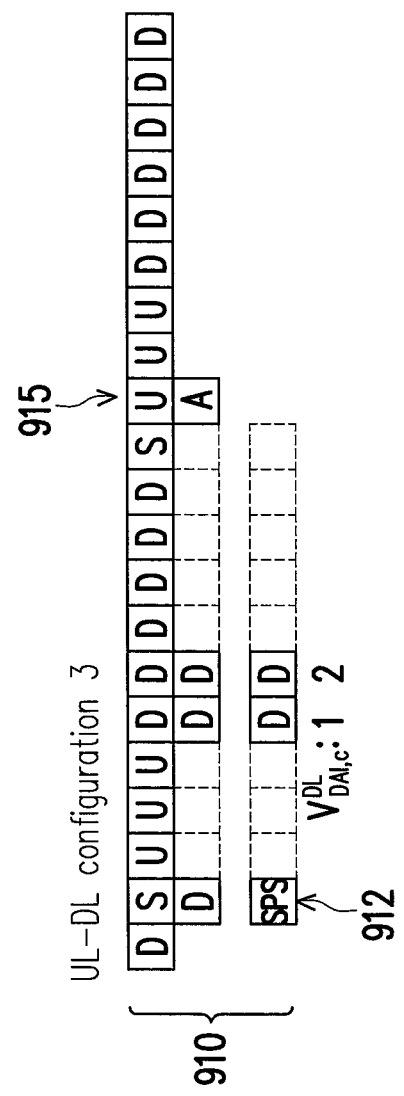

As shown in FIG. 9, in this example, an assigned number c of a serving cell 910 is equal to 0. A DL association set corresponding to a UL subframe 915 of the serving cell 910 includes a semi-persistent subframe 912 (labeled as SPS) and two normal DL subframes (labeled as D). The semi-persistent subframe 912 does not have a corresponding $V_{DAI,0}^{DL}$, and each $V_{DAI,0}^{DL}$ corresponding to the normal DL subframes is 1 and 2, respectively.

When the semi-persistent subframe might appear, the calculation of the value $W_{DAI}^{UE}$ should take the semi-persistent subframe into account. As for the serving cells of the second part of the embodiment A, the value $W_{DAI}^{UE}$ is the maximum value in the values $U_{DAI,c}$ of each serving cell c of the second part. As for each serving cell c of the second part, when the DL association set corresponding to the UL subframe specified by the base station in the serving cell c does not include the semi-persistent subframe, the value $U_{DAI,c}$ of the serving cell c is equal to the maximum value in the downlink assignment indexes $V_{DAI,c}^{DL}$ received by the UE in the serving cell c. When the DL association set corresponding to the UL subframe specified by the base station in the serving cell c includes the semi-persistent subframe, the value $U_{DAI,c}$ of the serving cell c is equal to the maximum value in the downlink assignment indexes $V_{DAI,c}^{DL}$ received by the UE in the serving cell c plus 1.

Figure 8:
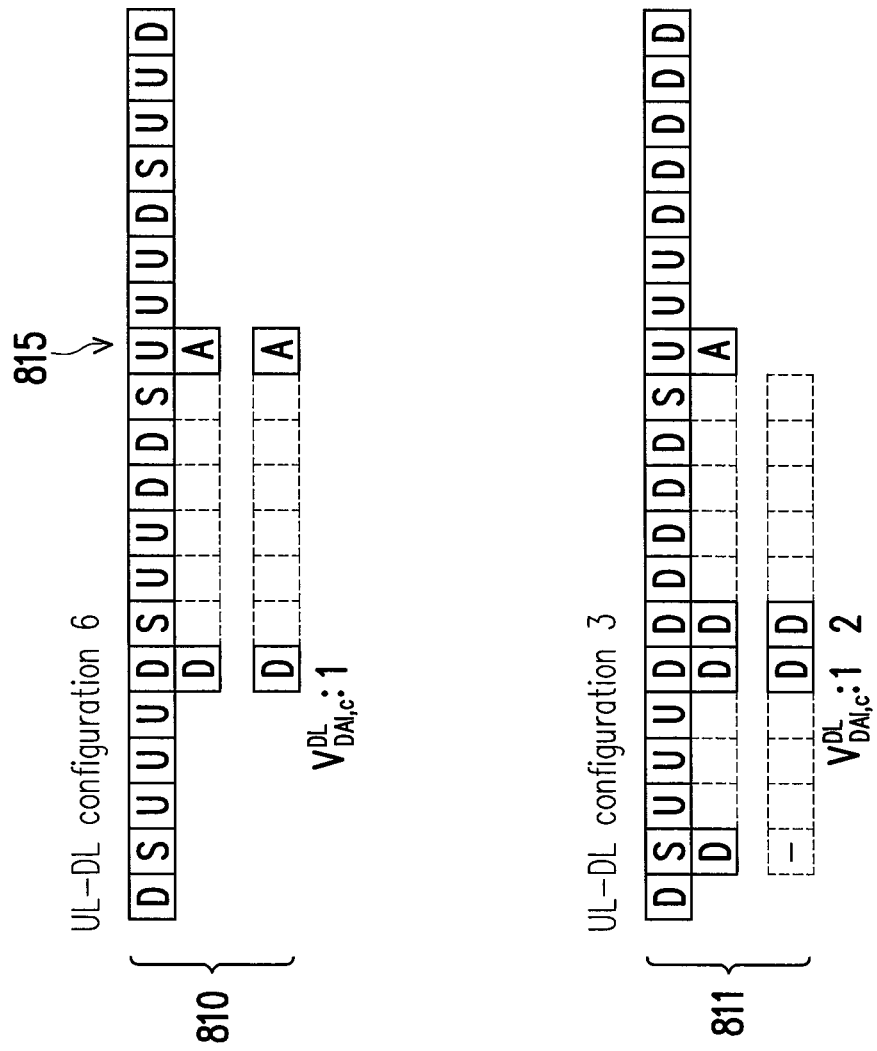

Taking FIG. 8 and FIG. 9 for example, if all the serving cells 810, 811 and 910 belong to the aforementioned second part, the values $U_{DAI,c}$ of the serving cells 810, 811 and 910 are 1, 2 and 3, respectively, and the value $W_{DAI}^{UE}$ is equal to the maximum value 3 among 1, 2 and 3.

For all the serving cells of the embodiment C, the value $W_{DAI}^{UE}$ is the maximum value in the values $U_{DAI,c}$ of each serving cell c. For each serving cell c of the embodiment C, when the DL association set corresponding to the UL subframe specified by the base station in the serving cell c does not include the semi-persistent subframe, the value $U_{DAI,c}$ of the serving cell c is equal to the maximum value in the downlink assignment indexes $V_{DAI,c}^{DL}$ received by the UE in the serving cell c. When the DL association set corresponding to the UL subframe specified by the base station in the serving cell c includes the semi-persistent subframe, the value $U_{DAI,c}$ of the serving cell c is equal to the maximum value in the downlink assignment indexes $V_{DAI,c}^{DL}$ received by the UE in the serving cell c plus 1.

When reporting HARQ-ACKs to the base station, the UE may put HARQ-ACK of the semi-persistent subframe in the last location of all HARQ-ACKs of the serving cell. Taking FIG. 9 for example, UE is required to report HARQ-ACKs of three DL subframes for the serving cell 910, which are [$A_0$, $A_1, A_2$], respectively. $A_0$ and $A_1$ are HARQ-ACKs of two DL subframes whose $V_{DAI,0}^{DL}$ are equal to 1 and 2, respectively. $A_2$ is a HARQ-ACK of the semi-persistent subframe 912.

For the first parts of the embodiment A and the embodiment B, the semi-persistent subframes are not taken into account by the UE since the base station can accurately calculate the downlink assignment index $W_{DAI}^{UL}$ depending on whether there is any semi-persistent subframe or not. Thus, the UE is only required to perform the HARQ-ACK report based on the value $W_{DAI}^{UL}$.

In the embodiments A, B, C and D as previously described, the value $M_c$ of each serving cell c is equal to the number of the subframes of the DL association set corresponding to an UL subframe specified by the base station of the serving cell c. However, another option may be made for the value $M_c$ of the disclosure. In a TDD wireless communication system supporting cross-carrier scheduling, a DL assignment of a serving cell $c_1$ may be controlled by another serving cell $c_2$. Based on some certain configurations of the cross-carrier scheduling, only when a corresponding subframe of a certain DL subframe of the serving cell $c_1$ is also a DL subframe in the serving cell $c_2$ at the same time, the serving cell $c_2$ may arrange downlink information in the DL subframe of the serving cell $c_1$. There is a different method to calculate the value $M_c$ for serving cells using the cross-carrier scheduling.

For example, referring to FIG. 1C and FIG. 1D, when the serving cell $c_1$ uses the UL-DL configuration 2, the serving cell $c_2$ uses the UL-DL configuration 3, and the base station specifies that the UE reports HARQ-ACKs in the subframe 2 of the second frame. The number of the subframes of the DL association set corresponding to the subframe 2 of the serving cell $c_1$ is 4, however the corresponding subframes of the DL association set in the serving cell $c_2$ includes only 3 DL subframes at the same time. Namely, the DL subframe 4 of the first frame in the serving cell $c_1$ would be never used to transmit downlink information to the UE. At this time, the value $M_1$ of the serving cell $c_1$ may be set as the number of subframes of the intersection of the DL association set of the serving cell $c_1$ and the DL subframes of the serving cell $c_2$, i.e. 3. Therefore, the number of HARQ-ACKs that have to be reported by the UE may be further reduced. The cross-carrier scheduling may be applied in all of the embodiments A, B, C and D, and such method may be adopted for calculating the value $M_c$ of the serving cells thereof.

According to some configurations, a special subframe may be deemed as a DL subframe. In the aforementioned embodiments, the special subframe (S) in each serving cell is deemed as the DL subframe (D). However, according to some configurations, the special subframe may not be deemed as the DL subframe. If the special subframe is not deemed as the DL subframe, then, in each serving cell of the aforementioned embodiments, the base station would not transmit downlink information to the UE in the special subframe. Thus, the number of the DL subframes of each serving cell and in the DL association set of each serving cell should be adjusted correspondingly.

Based on the foregoing, in the TDD wireless communication system and the method for reporting the HAQR-ACK of the disclosure, the difference of the UL-DL configuration applied by each serving cell can be adopted in many ways to calculate the number of the DL subframe of each serving cell whose HARQ-ACK should be reported so as to efficiently and accurately report the HAQR-ACK.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for reporting hybrid automatic repeat request acknowledgement (HARQ-ACK) applicable to a time-division duplex (TDD) wireless communication system, comprising:
receiving downlink information from multiple serving cells of a base station of the TDD wireless communication system, wherein the multiple serving cells use multiple uplink-downlink configurations;
calculating a report number of each of the multiple serving cells, wherein the report number is a number of downlink (DL) subframes of the corresponding serving cell whose acknowledgements (HARQ-ACKs) have to be reported, and the report number of at least one of the serving cells is determined according to a downlink (DL) association set of an uplink (UL) subframe specified by the base station in the serving cell; and
providing report information to the base station in the UL subframe of one of the multiple serving cells specified by the base station, wherein the report information comprises the HARQ-ACKs that have to be reported for each of the serving cells,
wherein the report number of the at least one of the serving cells is determined according to the DL association set corresponding to different UL-DL configurations of the serving cell of the UL subframe specified by the base station in the serving cell, except when the at least one of the serving cells is the one of the serving cells specified by the base station.

2. The method for reporting the HARQ-ACK according to claim 1, wherein the multiple serving cells comprise a first part and a second part, the report number of each serving cell of the first part is equal to a first downlink assignment index provided by the base station, and a report number of each serving cell of the second part is determined according to at least one second downlink assignment index provided by the base station and the DL association set of the serving cell.

3. The method for reporting the HARQ-ACK according to claim 2, wherein the first part comprises serving cells among the multiple serving cells adopting an uplink-downlink (UL-DL) configuration same as that of the serving cell specified by the base station, the second part comprises serving cells among the multiple serving cells adopting a UL-DL configuration different from that of the serving cell specified by the base station, the first downlink assignment index is a downlink assignment index of uplink grant downlink control information (DCI) provided by the base station, and the second downlink assignment indexes are downlink assignment indexes of multiple DL assignment DCI from the base station received in the second part.

4. The method for reporting the HARQ-ACK according to claim 3, wherein for each serving cell of the second part, the report number of the serving cell is a minimum value in a first value and a second value, the first value is generated based on the second downlink assignment indexes, the second value is generated based on the DL association set of the serving cell, and the report information further comprises the first value.

5. The method for reporting the HARQ-ACK according to claim 4, wherein the first value is a maximum value in a third value of each serving cell of the second part, and for each serving cell of the second part, the third value of the serving cell is equal to a maximum value in the second downlink assignment indexes of the serving cell when the downlink association set of the serving cell does not comprise any semi-persistent subframe, and the third value of the serving cell is equal to the maximum value in the second downlink assignment indexes of the serving cell plus 1 when the downlink association set of the serving cell comprises a semi-persistent subframe.

6. The method for reporting the HARQ-ACK according to claim 4, wherein for each serving cell of the second part, the second value is either equal to a number of the subframes of the DL association set of the serving cell or equal to a number of subframes of an intersection of the DL association set of the serving cell and DL subframes of another serving cell.

7. The method for reporting the HARQ-ACK according to claim 1, wherein the report number of each of the serving cells is determined according to at least one downlink assignment index provided by the base station and the DL association set of the serving cell.

8. The method for reporting the HARQ-ACK according to claim 7, wherein the report number of each of the serving cells is equal to a minimum value in the downlink assignment index and a value, the downlink assignment index is a downlink assignment index of UL grant DCI provided by the base station, the value is generated according to the DL association set of the serving cell.

9. The method for reporting the HARQ-ACK according to claim 8, wherein for each of the serving cells, the value is either equal to a number of subframes of the DL association set of the serving cell or equal to a number of subframes of an intersection of the DL association set of the serving cell and DL subframes of another serving cell.

10. The method for reporting the HARQ-ACK according to claim 7, wherein the downlink assignment indexes are downlink assignment indexes of multiple DL assignment DCI from the base station received in the multiple serving cells; for each of the serving cells, the report number of the serving cell is equal to a minimum value in a first value and a second value, the first value is generated according to the downlink assignment indexes, the second value is generated according to the DL association set of the serving cell, and the report information further comprises the first value.

11. The method for reporting the HARQ-ACK according to claim 10, wherein the first value is a maximum value of a third value of each of the serving cells; for each of the serving cells, the third value of the serving cell is equal to a maximum value in the downlink assignment indexes of the serving cell when the DL association set of the serving cell does not comprise any semi-persistent subframe, and the third value of the serving cell is equal to the maximum value in the downlink assignment indexes of the serving cell plus 1 when the DL association set of the serving cell comprises a semi-persistent subframe.

12. The method for reporting the HARQ-ACK according to claim 10, wherein for each of the serving cells, the second value is either equal to a number of subframes of the DL association set of the serving cell or equal to a number of subframes of an intersection of the DL association set of the serving cell and DL subframes of another serving cell.

13. The method for reporting the HARQ-ACK according to claim 1, wherein the report number of each of the serving cells is determined according to the DL association set of the serving cell.

14. The method for reporting the HARQ-ACK according to claim 13, wherein for each of the serving cells, the report number of the serving cell is either equal to a number of subframes of the DL association set of the serving cell or equal to a number of subframes of an intersection of the DL association set of the serving cell and DL subframes of another serving cell.

15. A time-division duplex (TDD) wireless communication system, comprising:
a base station, transmitting downlink information in multiple serving cells of the TDD wireless communication system and specifying an uplink (UL) subframe of one of the multiple serving cells, wherein the multiple serving cells use multiple uplink-downlink (UL-DL) configurations; and
a user equipment (UE), receiving the information, calculating a report number of each of the serving cells, providing report information to the base station in the UL subframe of the serving cell specified by the base station, wherein the report number is a number of DL subframes of the corresponding serving cell whose hybrid automatic repeat request acknowledgements (HARQ-ACKs) have to be reported, the report information comprises the HARQ-ACKs that have to be reported for each of the serving cells, and the report number of at least one of the serving cells is determined according to a DL association set of the UL subframe of the same serving cell,
wherein the report number of at least one of the serving cells is determined according to the DL association set corresponding to different UL-DL configurations of the same serving cell of the UL subframe of the same serving cell, except when the at least one of the serving cells is the same serving cell.

16. The TDD wireless communication system according to claim 15, wherein the multiple serving cells comprise a first part and a second part, the report number of each serving cell of the first part is equal to a first downlink assignment index provided by the base station, and the report number of each serving cell of the second part is determined according to at least one second downlink assignment index provided by the base station and the DL association set of the serving cell.

17. The TDD wireless communication system according to claim 16, wherein the first part comprises serving cells among the multiple serving cells adopting an UL-DL configuration same as that of the serving cell specified by the base station, the second part comprises serving cells among the multiple serving cells adopting a UL-DL configuration different from that of the serving cell specified by the base station, the first downlink assignment index is a downlink assignment index of UL grant downlink control information (DCI) provided by the base station, and the second downlink assignment indexes are downlink assignment indexes of multiple DL assignment DCI from the base station received by the UE in the second part.

18. The TDD wireless communication system according to claim 17, wherein for each serving cell of the second part, the report number of the serving cell is a minimum value in a first value and a second value, the first value is generated based on the second downlink assignment indexes, the second value is generated based on the DL association set of the serving cell, and the report information further comprises the first value.

19. The TDD wireless communication system according to claim 18, wherein the first value is a maximum value in a third value of each serving cell of the second part, and for each serving cell of the second part, the third value of the serving cell is equal to a maximum value in the second downlink assignment indexes of the serving cell when the downlink association set of the serving cell does not comprise any semi-persistent subframe, and the third value of the serving cell is equal to the maximum value in the second downlink assignment indexes of the serving cell plus 1 when the downlink association set of the serving cell comprises a semi-persistent subframe.

20. The TDD wireless communication system according to claim 18, wherein for each serving cell of the second part, the second value is either equal to a number of subframes of the DL association set of the serving cell or equal to a number of subframes of an intersection of the DL association set of the serving cell and DL subframes of another serving cell.

21. The TDD wireless communication system according to claim 15, wherein the report number of each of the serving cells is determined according to at least one downlink assignment index provided by the base station and the DL association set of the serving cell.

22. The TDD wireless communication system according to claim 21, wherein the report number of each of the serving cells is equal to a minimum value in the downlink assignment index and a value, the downlink assignment index is a downlink assignment index of UL grant DCI provided by the base station, the value is generated according to the DL association set of the serving cell.

23. The TDD wireless communication system according to claim 22, wherein for each of the serving cells, the value is either equal to a number of subframes of the DL association set of the serving cell or equal to a number of subframes of an intersection of the DL association set of the serving cell and DL subframes of another serving cell.

24. The TDD wireless communication system according to claim 21, wherein the downlink assignment indexes are downlink assignment indexes of multiple DL assignment DCI from the base station received by the UE in the multiple serving cells; for each of the serving cells, the report number of the serving cell is equal to a minimum value in a first value and a second value, the first value is generated according to the downlink assignment indexes, the second value is generated according to the DL association set of the serving cell, and the report information further comprises the first value.

25. The TDD wireless communication system according to claim 24, wherein the first value is a maximum value of a third value of each of the serving cells; for each of the serving cells, the third value of the serving cell is equal to a maximum value in the downlink assignment indexes of the serving cell when the DL association set of the serving cell does not comprise any semi-persistent subframe, and the third value of the serving cell is equal to the maximum value in the downlink assignment indexes of the serving cell plus 1 when the DL association set of the serving cell comprises a semi-persistent subframe.

26. The TDD wireless communication system according to claim 24, wherein for each of the serving cells, the second value is either equal to a number of subframes of the DL association set of the serving cell or equal to a number of subframes of an intersection of the DL association set of the serving cell and DL subframes of another serving cell.

27. The TDD wireless communication system according to claim 15, wherein the report number of each of the serving cells is determined according to the DL association set of the serving cell.

28. The TDD wireless communication system according to claim 27, wherein for each of the serving cells, the report number of the serving cell is either equal to a number of subframes of the DL association set of the serving cell or equal to a number of subframes of an intersection of the DL association set of the serving cell and DL subframes of another serving cell.

* * * * *